Feb. 27, 1934.  E. F. ANNIS  1,949,002

SELF CLEANING DUST COLLECTOR

Filed March 15, 1932  3 Sheets-Sheet 1

INVENTOR:
Emmett F. Annis,
BY
ATTORNEY.

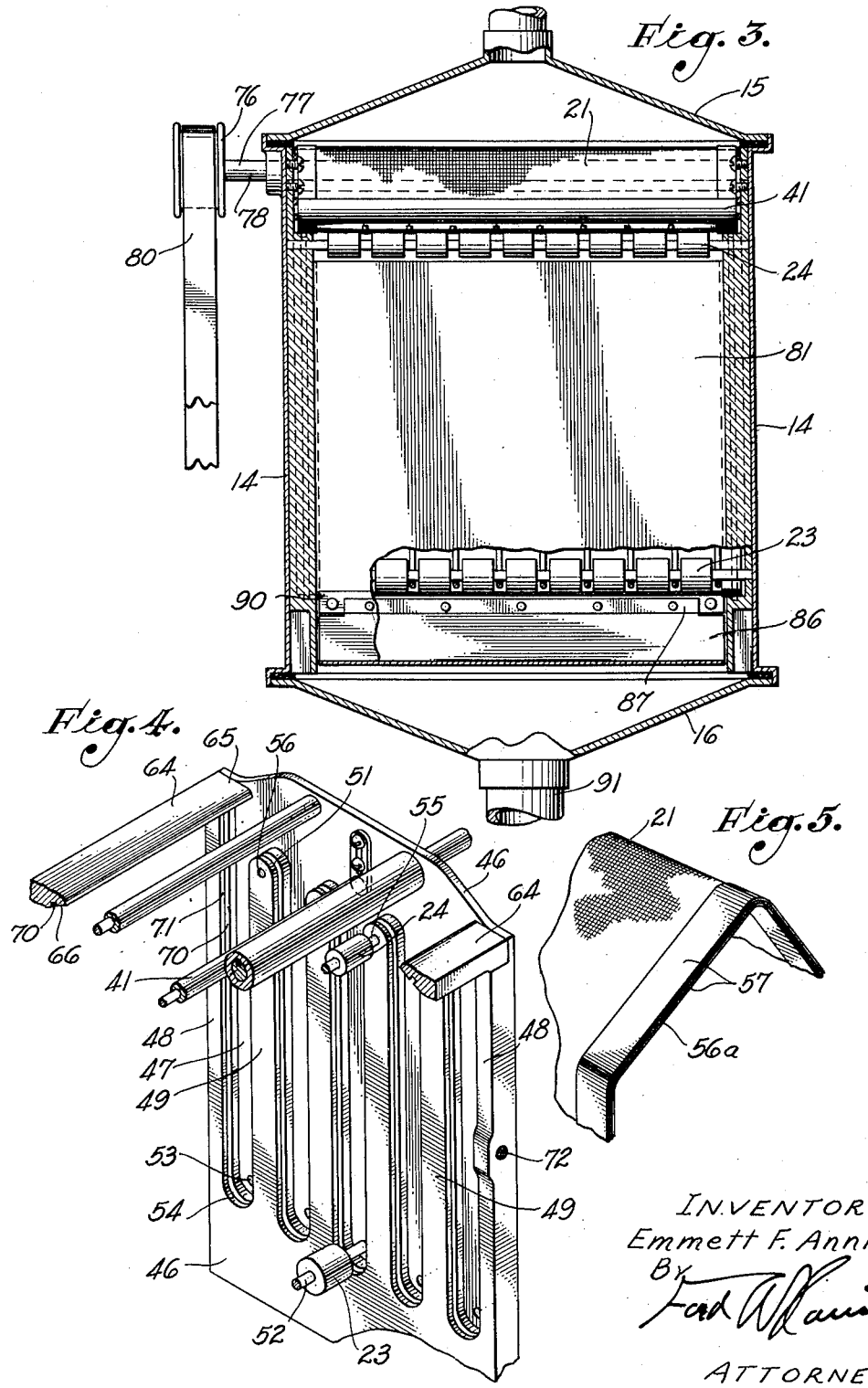

Feb. 27, 1934.   E. F. ANNIS   1,949,002
SELF CLEANING DUST COLLECTOR
Filed March 15, 1932   3 Sheets-Sheet 3

INVENTOR:
Emmett F. Annis
BY
ATTORNEY.

Patented Feb. 27, 1934

1,949,002

UNITED STATES PATENT OFFICE 1,949,002

SELF-CLEANING DUST COLLECTOR

Emmett F. Annis, Glendale, Calif.

Application March 15, 1932. Serial No. 598,949

4 Claims. (Cl. 183—63)

My invention relates to devices for separating solids from fluids and relates particularly to a device for removing small solid particles, commonly known as dust, from gases or air.

It is an object of my invention to provide a dust collector having a filter member therein comprising a wall similar in form to a belt, and means for moving this wall through a dust-collecting zone and then through a cleaning zone wherein the dust particles collected by the filter member are removed from the filter member.

It is an object of the invention to provide a dust collector having a filter means in the form of a belt, the ends of which are joined together to form a continuous loop, and means for continuously moving the belt through dust-collecting and dust-removing zones, thereby providing a dust collector having a dust-collecting element therein which is continuously self-cleaning in character.

It is an object of my invention to provide in a device of the above character a path through which a belt-like filter member or dust collector is continuously moved, this path being divided into primary and secondary parts, the primary part of said path being conducted through a sinuous course so that the length of the belt-like dust collector passing through this primary part of the path will be extremely long as compared to the part of the belt in the secondary part of the path, thereby providing a very large area of the belt-like dust collector in the dust-collecting zone and a relatively small area of the dust collector in the dust-removing zone of the device.

A further object of the invention is to provide in such a dust collector means for forming primary and secondary chambers along the primary and secondary portions of the path containing the belt-like dust collector, and means for conducting a fluid to be cleaned into the primary chamber, and means for causing the removal of dust from the dust collector as it passes in communication with the secondary chamber.

It is an important feature of the invention, and one which makes it possible to construct a cleaner for fluids of relatively high capacity in a comparatively small space, to conduct the fluid and dust-collecting walls through a sinuous path whereby to cause the adjacent portions of the path through which the fluid is carried to lie in parallel relationship or to radiate relative to a central point.

It is a further object of the invention to provide a device of the character described in which means are provided for varying the pressure within the secondary chamber so as to cause fluid to pass through that portion of the belt-like dust collector in communication with the secondary chamber. This feature of my invention makes it possible to exert a continuous suction in the secondary chamber so as to cause fluid to pass through the belt-like dust collector for the purpose of causing the dust collector to pick up dust from the fluid, such as gas or air, in the primary chamber or passage of the device, and also to cause dust to be removed from the belt-like dust collector as it passes across the secondary chamber of the device.

A further object of the invention is to provide a device of the above character having rollers for supporting the dust collector and permitting it to be readily moved.

It is a further object of the invention to provide a device of the above character in which the dust collector is carried across a vacuum cleaner for removing the collected particles therefrom, this vacuum cleaner being operated by suction from any desired source. In view of the fact that my invention has its principal utility as a means for removing dust particles from gases, it has herein been principally treated as a dust collector, but it will be recognized that the device may be readily constructed so as to remove suspended particles of any kind from fluids including liquids and gases. Accordingly, the term "dust" as employed herein should be considered in its broadest sense as meaning particles of solid or semi-solid materials, or materials which are not dissolved in the fluid to be cleaned.

In the practice of my invention all of the fluid to be cleaned may be passed along the absorbing or collecting walls which form the fluid passages of the device, part of the fluid may be passed through the filter or collector member, or all of the fluid may be passed through the filter member. The most economical operation of the device, however, is where a maximum part of the fluid to be cleaned is conducted through the fluid passages in contact with the collector walls, and a minimum part of the fluid is drawn through the collector walls.

It is a further object of the invention to provide a simple means for sealing between the edges of the walls forming the primary and secondary chambers and the cooperating edge parts of the dust collector.

A further object of the invention is to provide in the primary chamber of the device receptacles in which heavier particles of material which separate from the fluid being cleaned may collect, these receptacles having normally closed openings through which the collected heavier particles of material may be removed.

It is a further object of my invention to provide a method for cleaning fluids, which consists essentially of conducting a fluid to be cleaned through a passage, the wall of which passage is capable of holding solid particles thereon, the fluid being conducted through the passage in such a manner that all portions of the fluid come at some time into engagement with the wall surface so that the solid particles carried in the fluid will be retained on such wall surface.

It is a further object of the invention to provide a method of the foregoing character in which the solid particles are caused to adhere to the collecting wall by the suction effect of the passage of a quantity of fluid continuously through the wall.

Further objects and advantages of the invention will be brought out in the following part of the specification.

Referring to the drawings which are for illustrative purposes only:

Fig. 3 is a vertical section taken substantially as indicated by the line 3—3 of Fig. 1.

Fig. 4 is a fragmentary partly sectioned perspective elevation showing the sealing means employed in the preferred practice of my invention.

Fig. 5 is a fragmentary perspective elevation showing an edge of the filter or dust collector.

Figure 1:
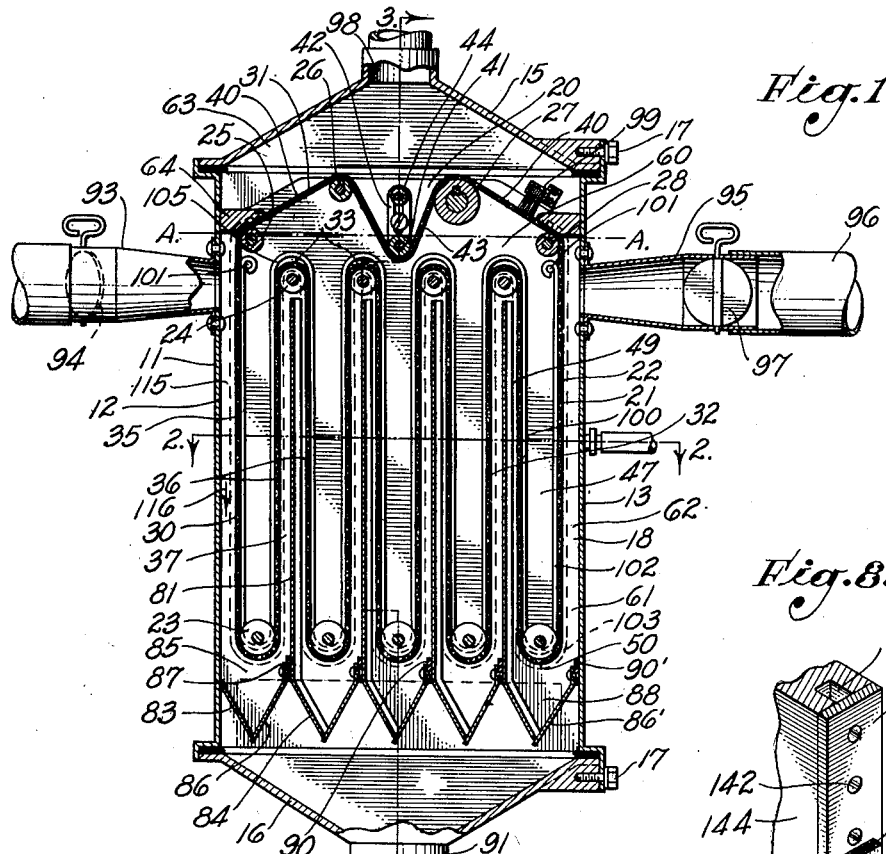
Fig. 1 is a vertically sectioned view of a preferred form of my invention.

Although my invention may be employed to separate solids or semi-solids from various fluids, such as liquids and gases, I shall hereinafter for the purpose of maintaining simplicity in this disclosure describe my invention essentially as a dust collector for collecting or separating dust particles from gas or air.

In the preferred form of my invention shown in Figs. 1 to 5, I provide a housing 11 having front and rear walls 12 and 13, side walls 14, a cover 15, and a bottom 16, the cover 15 and the bottom 16 being secured in place by screws 17. For descriptive purposes and for future reference in the claims of this application, a line A—A of Fig. 1 defines a plane which divides the interior of the housing 11 into a primary or lower portion 18 and an upper or secondary portion 20.

Within the housing and communicating with the primary and secondary portions 18 and 20 thereof is a movable filter or collector member 21 in the form of a continuous belt and preferably being made from a closely woven cloth or felt, and such member is preferably impregnated with a moistening agent such as oil. For the purpose of defining a continuous closed path 22 through which the collector member 21 may move I provide lower or primary rollers 23 and 24 and upper or secondary rollers 25, 26, 27, and 28 which are so placed that the plane A—A intersects the path 21 and divides it into a lower or primary part 30 and an upper or secondary part 31. The lower rollers 23 and 24 are consecutively staggered or offset in vertical direction so that the lower or primary part 30 of the path 22 of the belt 21 follows a sinuous course extending from a point adjacent the front wall 12 of the housing 11 to a point adjacent the rear wall 13 of the housing 11. The primary part 30 of the path 21 starts at the roller 25 and ends at the roller 28. The sinuous course which the primary part 30 of the path 22 follows is such that that portion of the collector member 21 extending through the primary part 30 of the path 22 consists of five consecutive loops 32 which are open at their upper ends and are joined by the curved portions 33 of the collector member 21 extending over the rollers 24. The part 35 of the first loop 32 is parallel to the front wall 12 and the following consecutive vertical parts 36 of the loops 32 are parallel so as to form vertical spaces 37 therebetween, which vertical spaces 37 are closed at their upper ends by the rollers 24 and which are open at their lower ends. The rollers 26 and 27 are placed higher than the rollers 25 and 28 so that the portions 40 extending from the roller 26 to the roller 25 and from the roller 28 to the roller 27 will slope downwardly.

For the purpose of tensioning the belt-like collector member 21 an adjustable roller 41 is mounted on end brackets 42 in position to engage a portion 43 of the member 21 between the rollers 26 and 27, the brackets 42 being vertically slidable on screws 44, Fig. 1, which may be tightened to hold the brackets 42 against upward movement. In the sides of the housing 11 adjacent the side walls 14 thereof are wall members 46 having vertical grooves or spaces 47 therein between vertical walls 48 and 49. The vertical spaces 47 are open at their upper ends and are semi-cylindrically rounded at their lower ends 54 to agree with the contour of the portions 50 of the member 21 extending under the rollers 23, and the upper ends 51 of the walls 49 are semi-cylindrically rounded to agree with the upper portions of the rollers 24. The rollers 23 and 24 are mounted on shafts 52 which extend into openings 53 in the wall members 46 substantially concentric to the semi-cylindrical rounded lower ends 54 of the spaces 47. The rollers 24 are mounted on shafts 55, the ends of which are received in openings 56 near the upper ends of the intervening walls 49. The walls 48 and 49 follow the sinuous course occupied by that portion of the collector member 21 in the primary part 30 of the path 22 and overlap the edges 56a of the collector member 21 which edges, as shown in Fig. 5, are covered with impervious strips 57 of a material such as leather or rubber.

In view of the fact that the continuous belt-like collector member 21 extends from one side of the housing 11 to the other side thereof, such collector member divides the interior of the housing into an inner space 60 which is that part of the interior of the housing within the path 22 followed by the member 21, and an outer space 61 which is that part of the interior space of the housing 11 outside of the path 22 followed by the member 21. The outer space 61 is divided into primary and secondary parts 62 and 63 by horizontal wall members 64 which extend inwardly from the front and rear walls 12 and 13 of the housing 11 above the plane A—A, such wall members 64 having their ends 65 connected to the walls 48, and having their inner sloping edges 66 engaging the lower portions of the sloping parts 40 of the collector member 21. The walls 12 and 13, the bottom 16, and the walls 48 and 49 enclose the primary part 62 of the outer space 61, or, in other words, these walls form a chamber 62 lying adjacent the primary part 30 of the path 22. For sealing between the edges of the wall forming the chamber or space 62 and the edges 56a of the collector or filter member 21, a continuous groove or channel 70 is extended the length of the diagonal faces 66 of the horizontal members 64 and is extended throughout the length of the continuous sinuous face 71 presented by the wall members 48 and 49 to the edge strips 57 on the edges 56a of the member 21. Through openings 72 which connect with the channels 70 suction pipes 73 may be connected by means of fittings 74 so that a continuous suction may be exerted in the channels or grooves 70 to draw the edge portions of the collector member 21 into engagement with the faces 66 and 71 of the members 64, 48, and 49. The belt-like collector member 21 may be caused to move through the path 22 by rotating a selective part of the rollers, and for this purpose I have shown the roller 27 as being of larger diameter than the other rollers and have shown a pulley 76 mounted on an extended end 77 of the shaft 78 by which the roller 27 is supported, which pulley 76 may be rotated by means of a belt 80.

Figure 8:
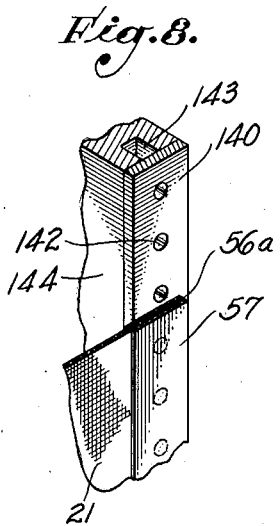
Fig. 8 is a fragmentary perspective view showing an alternative means for sealing the edges of the traveling collector or filter member employed in my invention.
Figure 2:
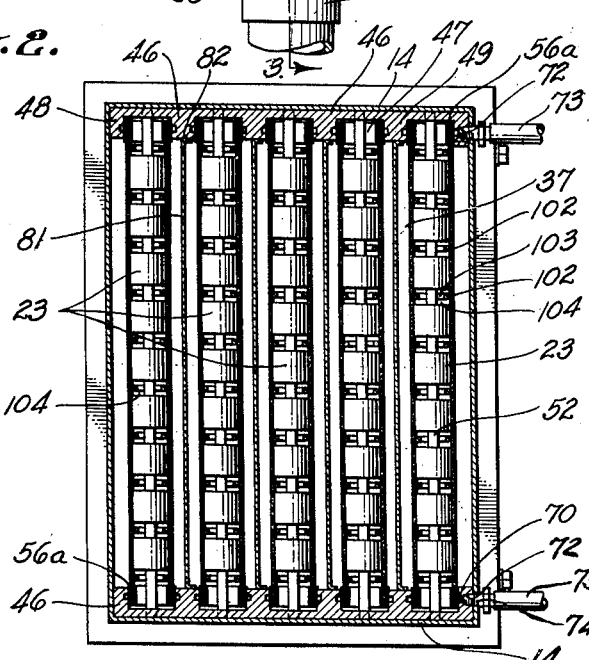
Fig. 2 is a cross-section on a plane represented by the line 2—2 of Fig. 1.

The channels 70 are representative of a means for holding the edges 56a of the members 21 in engagement with the walls 48 and 49. In Fig. 8 I show an alternative means whereby this suction effect may be accomplished through the use of a strip or plate 140 adapted to be engaged by the edge 56a of the member 21, such strip 140 providing consecutive holes 142 which communicate with a channel 143 formed in the wall member 144 on which the strip 140 is mounted. A suction exerted in the channel 143 is exerted in the openings 142 and holds the edge 56a against the plate 140.

Extending vertically and centrally within the spaces 37 between the loops 32 are partition walls 81, the edges 82 of which engage the inner faces of the wall members 49. Extending diagonally downwardly and inwardly from the lower portion of the front wall 12 of the housing 11 is a diagonal wall 83 which extends from one wall member 46 to the other, and extending diagonally downwardly from the lower end of each dividing wall 81 is a diagonal wall 84 which may be formed integrally with the lower end of the partition wall 81. Cooperating with the diagonal walls 83 and 84 to close the lower ends of the spaces 85 between the walls 12, 81, and 13, I provide diagonal door members 86 consisting of plates which extend from one wall member 46 to the other and have their upper edges 87 hingedly secured so that they may swing downwardly and permit discharge of collected materials from the spaces or receptacles 88 formed at the lower ends of the spaces 85. The first four door members 86 leading from the left of Fig. 1 are riveted to longitudinal rubber strips 90, which rubber strips are in turn riveted to the lower portions of the dividing walls 81, and the last of the doors 86, specifically designated as 86', is secured to a horizontal rubber strip 90', which is in turn secured to the lower portion of the rear wall 13 of the housing 11. The rubber strips 90 and 90' hold the door members 86 and 86' resiliently in closed position, but when fluid pressure is exerted above the door members they will open downwardly and permit collected materials to be discharged through the outlet member 91 of the bottom 16.

In the preferred use of this device a fluid to be cleaned, such as gas or air, is drawn into the leftward or front end of the chamber 62 through an inlet member 93 which may be provided with a butterfly type of valve 94, this inlet of fluid being produced by suction exerted on the rightward or rear end of the chamber or space 62 through an outlet member 95 which may be connected through a conduit 96 with a suction-exerting device. The outlet member 95 is shown as having a butterfly type of valve 97. At the same time suction is created in the secondary space 63. to effect a vacuum cleaning of the collector or filter member 21, through an opening 98 in the cover 15, which opening may be connected with a suitable suction-creating device, with the result that fluid such as gas or air is drawn upwardly through that portion of the collector or filter member 21 passing through the secondary part 31 of the path 22. This in turn creates a suction in the inner space 60 within the member 21 which causes fluid to be drawn from the primary space or chamber 62 through that portion of the member 21 in the primary or lower part 30 of the path 22. Also at this time the roller 27 is driven so as to cause the member 21 to move through the path 22. To assist in removal of collected particles I provide a brush 99, Fig. 1, secured in the upper chamber 20 and engaging the member 21.

To prevent the suction applied in the inner space 60 from deflecting the parts 36 of the loops 32, I provide a supporting frame 100 consisting of a pair of horizontal bars 101 which are respectively positioned below the rollers 25 and 28, and bars 102, the ends of which are secured to the bars 101 and which are bent to follow sinuous paths along the inner faces of the loops 32 or, in other words, along the inside of the primary part 30 of the path 22. The bars 102 are spaced laterally at such distances that the lower return bends 103 thereof are situated in spaces 104 between the rollers 23, such return bends 103 passing under the shafts 52 on which the rollers 23 are supported. The upper return bends 105 of the bars pass over the parts 33 of the collector member 21 which pass over the rollers 24.

The partition walls 81, extending upwardly into the spaces 37 and the members 83, 84, and 86, cooperate with the front and rear walls 11 and 12 in forming within the primary space 62 a sinuous passage 115 which follows the primary part 30 of the path 22 with the result that the fluid from which solid materials are to be collected passes from the inlet member 93 to the outlet member 95 through a sinuous course as indicated by arrows 116 and in close proximity to that portion of the moving belt-like member 21 lying in the primary part 30 of the path 22, with the result that finer particles of foreign material are caught upon the outer surface of the member 21 and there held due to passage of fluid continuously through the part of the member 21 lying in the primary part 30 of the path 22, and the heavy particles contained in the fluid to be cleaned settle into the receptacles 88 formed at the lower ends of the spaces 85. As the member 21 moves through the secondary portion 31 of the path 22, suction in the space or chamber 63 removes or sucks therefrom fine particles of material which are carried out through the opening 98, thus continuously cleaning the collector member 21 during the operation of the device.

When it is desired to discharge collected materials from the receptacles 88, the valves 94 and 97 in the inlet and outlet members 93 and 95 may be closed and a pressure may be exerted in the upper or secondary space 63, which pressure is transmitted to the space above the doors 86, causing them to open downwardly and discharge the materials which have been collected in the receptacles 88 through the outlet 91.

Figure 6:
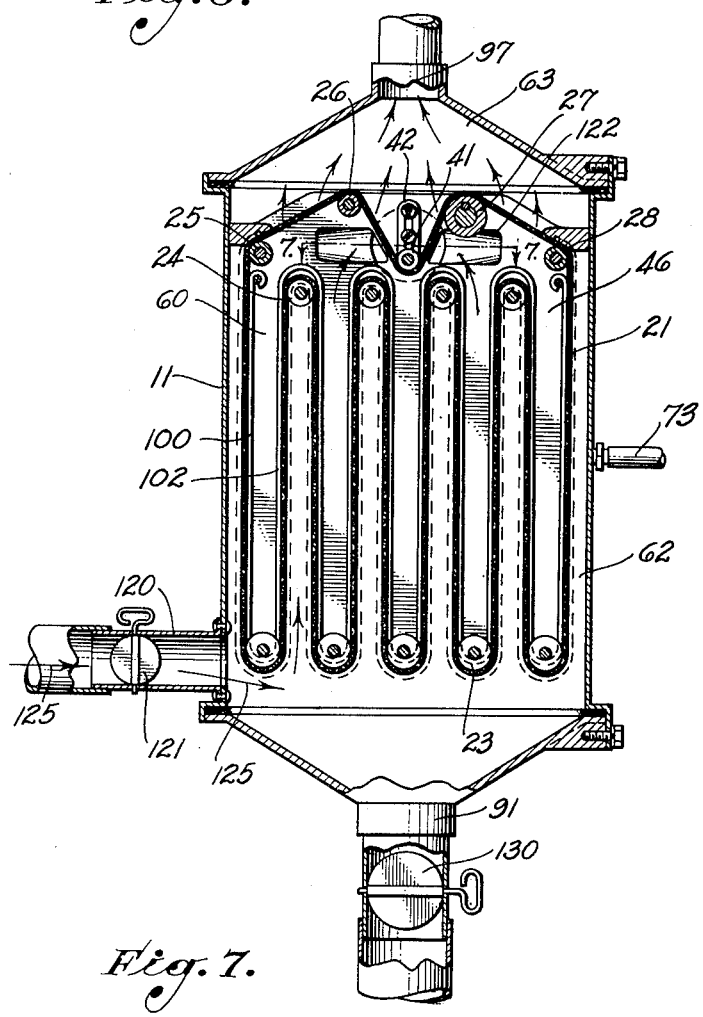
Fig. 6 is a vertically sectioned view showing an alternative form of my invention in which the fluid to be cleaned is passed through the belt-like filter or collector instead of along a face thereof, as shown in Figs. 1 to 5.
Figure 7:
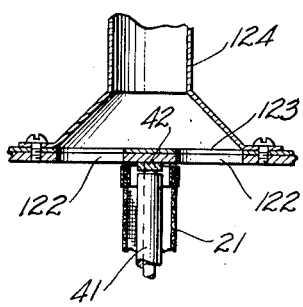
Fig. 7 is a fragmentary cross-section taken as indicated by the line 7—7 of Fig. 6.

The embodiment of my invention shown in Figs. 6 and 7 employs many parts identical with parts in the disclosure, Figs. 1 to 5, but differs from the first form of my invention by changing the position of the inlet and outlet for a fluid to be cleaned and by abandoning the use of partition walls 81, so that in this second form of my invention the fluid to be cleaned is drawn through the collector or filter member 21 instead of traveling along the face of the collector or filter member 21 in close proximity thereto. As clearly shown in Fig. 6, an inlet member 120 leads into the housing 11 at a point near the lower end thereof and may be equipped with a valve 121. In one of the wall members 46 and adjacent the upper end thereof outlet openings 122 are formed which communicate with openings 123 in a side wall 14 of the housing 11 and with an outlet member 124 which is secured over the openings 123. Consequently the air to be cleaned is led into the primary chamber or space 62 as indicated by arrows 125 and due to suction exerted on the outlet 124 is drawn through the belt-like filter member 21 into the space 60 within the filter member 21 and is subsequently drawn out of the cleaning device through the outlet 124 which communicates with the upper end of the inner space 60. As previously described, a continuous suction is exerted through the opening 97 of the secondary space 63 so that as the belt-like filter member 21 passes across the lower part of the space 63 the foreign materials which have been collected on and in the surface portion thereof will be removed and carried out through the opening 97. Owing to the large cross-sectional area of the housing 11 as compared to the cross-sectional area of the inlet 120, the fluid to be cleaned flows at a greatly reduced velocity within the housing 11 and heavier particles of foreign material may settle at the bottom of the housing from which they may be subsequently discharged by opening a valve 130 in the discharge outlet 91 and creating a pressure within the housing 11 by forcing fluid into the housing through any of the members 97, 120 or 124.

Although I have herein shown and described my invention in simple and practical form, it is recognized that certain parts or elements thereof are representative of other parts, elements, or mechanisms which may be used in substantially the same manner to accomplish substantially the same results; therefore, it is to be understood that the invention is not to be limited to the details disclosed herein but is to be accorded the full scope of the following claims.

I claim as my invention:

1. A dust collector of the character described, including: a filter member in the form of a belt in a continuous loop; a housing having a wall structure surrounding said filter member, said housing comprising primary and secondary parts, said filter member dividing the interior of said housing into an inner and an outer space; primary rollers supporting a portion of said filter member in the primary part of said housing, said primary rollers being so placed as to determine a sinuous path for said filter member in said primary part of said housing; secondary rollers supporting a portion of said filter member in the secondary part of said housing; sealing walls at the sides of said housing, said sealing walls overlapping the edges of the part of said filter member in said secondary part of said housing, each of said sealing walls having a channel therein in which a suction is created to hold said edges of said filter member in engagement with said sealing walls; means for moving said filter member; means for directing a fluid to be cleaned through said primary part of said housing outside of said filter member; and means for varying the pressure in said secondary part of said housing adjacent the outer face of said filter member, to cause fluid to pass through said filter member.

2. A dust collector of the character described, including: a filter member in the form of a belt in a continuous loop; a housing having a wall structure surrounding said filter member, said housing comprising primary and secondary parts, said filter member dividing the interior of said housing into an inner and an outer space; primary rollers supporting a portion of said filter member in the primary part of said housing, said primary rollers being so placed as to determine a sinuous path for said filter member in said primary part of said housing; secondary rollers supporting a portion of said filter member in the secondary part of said housing; sealing walls at the sides of said housing, said sealing walls overlapping the edges of the part of said filter member in said secondary part of said housing, each of said sealing walls having a channel therein in which a suction is created to hold said edges of said filter member in engagement with said sealing walls; means for moving said filter member; means dividing said outer space within said housing into primary and secondary parts, said dividing means having sealing engagement with the outside of said filter member; means for directing a fluid to be cleaned through the primary part of said outer space within said housing; and means for varying the pressure in the secondary part of said outer space within said housing, to cause fluid to pass through said filter member.

3. A dust collector of the character described, including: a filter member in the form of a belt; means establishing a path of movement for said filter member; walls forming a primary chamber to receive a fluid to be cleaned, said primary chamber extending along a part of said path; walls forming a secondary chamber along another part of said path in which materials collected from said fluid may be dislodged from said filter member; means forming a seal between the edges of said walls and said filter member, said sealing means comprising a channel between the edges of said walls; and means for drawing fluid from said channel.

4. A dust collector of the character described, including: a filter member in the form of a belt; means establishing a path of movement for said filter member; walls forming a primary chamber to receive a fluid to be cleaned, said primary chamber extending along a part of said path; walls forming a secondary chamber along another part of said path in which materials collected from said fluid may be dislodged from said filter member; means utilizable to vary the pressure in said secondary chamber whereby to cause movement of fluid through said filter member in said primary chamber; and means operated by a difference in fluid pressure upon opposite sides of portions of said filter member for retaining said filter member in fluid-tight engagement with said walls.

EMMETT F. ANNIS.